United States Patent Office.

JOSEPH HAFENEGGER, OF SAN FRANCISCO, CALIFORNIA.

Letters Patent No. 81,894, dated September 8, 1868.

---

IMPROVEMENT IN EXPLOSIVE COMPOUNDS.

---

*The Schedule referred to in these Letters Patent and making part of the same.*

---

TO ALL WHOM IT MAY CONCERN:

Be it known that I, JOSEPH HAFENEGGER, of the city and county of San Francisco, State of California, have invented an Improved Explosive Compound and Self-Igniting Time-Match, as a substitute for gun and blasting-powder; and I do hereby declare that the ingredients used in making and using said powder, and the process of mixing or compounding them to make it, are described in the following specification, with directions for using the same when compounded.

In the manufacture of my powder, the same general combination of ingredients is employed, with one or two exceptions, in which cases a change of from one to two of the agents is made, as, for instance, where a weaker or stronger or self-explosive compound is wanted, and for a better understanding of the different quantities, I designate by numbers, as follows, to wit:

No. 1 is composed of nine (9) pounds of chlorate potash, one-fourth ($\frac{1}{4}$) pound of sulphur, and one-fourth ($\frac{1}{4}$) pound of light charcoal: I prefer willow charcoal. The potash and charcoal are first pulverized and mixed, and then the sulphur is added, and the whole thoroughly incorporated; or six (6) parts of chlorate potash, four (4) parts charcoal, and one part sulphur may be employed. By these proportions a very good powder is had, but the strength is not so great as in the former proportions, neither is it quite so safe. These compounds, when so formed, make a very good and cheap blasting-powder, when saturated with a liquid or liquids which I will describe below.

No. 2 is prepared with two (2) pounds chlorate potash, one (1) pound fine dry white sugar, one (1) pound ferro-prussiate potash. I pulverize the potash and add the sulphur and sugar in rotation. This is self-exploding in from one-half ($\frac{1}{2}$) to two (2) hours, according to the temperature in which it is kept or exposed to the air, that is to say, when saturated with the liquid above mentioned. This liquid, which I term a self-igniting liquid or match, consists of one (1) to two (2), more or less, parts phosphorus, and dissolved in two parts bisulphuret of carbon, and its effect is more or less instantaneous upon the compound, according to the degree of saturation; for instance, if the compound is thoroughly wetted with the liquid, it will explode much later than when only partially saturated. A nearer approximation may be had by experimenting and timing.

No. 3 is composed of four (4) pounds of chlorate potash, one-fourth ($\frac{1}{4}$) pound of powdered charcoal, one (1) pound sulphur or sugar, and one (1) pound ferro-prussiate potash, which, when mixed, forms a good shooting-powder, and may be used with or without my self-lighting match. If saturated with the liquid it will be of much greater strength, or a compound made of three and one-half ($3\frac{1}{2}$) pounds of chlorate potash, one (1) pound of ferro-prussiate potash, and one (1) pound of sulphur may be employed, leaving out the sugar, will form a good and cheap shooting-powder, with or without the match.

No. 4, I prepare with four (4) pounds chlorate potash, four (4) pounds sugar, one-fourth ($\frac{1}{4}$) pound charcoal, more or less, and one-fourth ($\frac{1}{4}$) sulphur. This preparation may be used for blasting and for shells.

No. 5 is prepared by using one part chlorate potash and one part sugar. This is a very good self-exploding compound when the fluid is added, but will not go off by the direct action of fire, but will explode by percussion, and when it is saturated with the self-lighting match will explode in one-half hour.

This last compound is also a very good one for shells, giving a terrible explosive effect; such that when placed in a small aperture, so small that if filled with gunpowder and ignited, it would have no effect whatever, it would burst the shell to fragments. In this case, where a match is wanted, the opening leading to the chamber of the shell is filled with common gun-cotton, saturated or wet with my self-igniting fluid, when it will ignite at the set or desired time without the aid of fire. Care should be taken to have the saturated gun-cotton touch the compound.

This compound will be found very effective and cheap for blasting in mines, as dampness or water will not greatly impair its efficacy, and the ease and safety with which it can be transported will commend it to parties, as it can be mixed at the place of using by unskillful hands. I would also recommend that the fluids of which the match is composed be transported in separate flasks, as the quantity of each to be used can be determined after a little practice.

No little importance can be attached to this compound as a match, by nations at war with each other, as where mines are to be exploded and cities destroyed, for it can be so timed that the explosion need not take place until the dislodged army are a great distance away. Powder-magazines in the enemy's country or on the field of battle may be exploded by spies or other persons, with little danger of detection. Tissue-paper wet with it, will soon take fire and burn, and that in the highest wind, where common matches would fail.

Powder No. 3 will explode by a slight tap with an iron, or a wheel passing over it on a stone or iron road-way, but not until after it has been saturated with the fluid above described, and thoroughly dried. This compound will make good cartridges, that will explode by percussion; also, chloride of potash will explode by itself, when mixed with the self-lighting match.

Having thus described my invention, what I claim, and desire to secure by Letters Patent, is—

The within-described explosive compounds, consisting of Nos. 1, 2, 3, 4, 5, made of the ingredients enumerated, mixed or compounded in about the proportions specified.

I also claim the self-igniting match, compounded of the liquids or fluids enumerated, whether applied separately or mixed, to the explosive compounds or materials sought to be ignited or exploded, substantially as described.

In witness whereof, I have hereunto set my hand and seal.

JOSEPH HAFFNEGGER. [L. S.]

Witnesses:
   CALVIN BROWN,
   C. W. M. SMITH.